United States Patent [19]
Glaug et al.

[11] Patent Number: 5,542,566
[45] Date of Patent: Aug. 6, 1996

[54] REUSABLE DISPENSER AND A PLURALITY OF DISPOSABLE CHILD MITT WIPES CONTAINED THEREIN

[75] Inventors: Frank S. Glaug, Appleton; Christopher P. Olson; Kathleen I. Ratliff, both of Neenah; Donald A. Sheldon, Appleton; Valerie V. Finch, Neenah, all of Wis.; L. Warren Collier, IV, Roswell, Ga.

[73] Assignee: Kimberly-Clark Corporation, Neenah, Wis.

[21] Appl. No.: 344,264

[22] Filed: Nov. 23, 1994

[51] Int. Cl.⁶ .................................................. A47K 10/24
[52] U.S. Cl. ............................................. 221/48; 221/63
[58] Field of Search ............................ 221/33, 45, 48, 221/47, 63; 206/812, 494

[56] References Cited

U.S. PATENT DOCUMENTS

| | | | |
|---|---|---|---|
| D. 290,777 | 7/1987 | Lee | D32/40 |
| D. 303,725 | 9/1989 | Rojko et al. | D29/20 |
| D. 307,198 | 4/1990 | Rojko et al. | D29/20 |
| D. 307,199 | 4/1990 | Rojko et al. | D29/20 |
| 2,044,428 | 6/1936 | Gilmer | 15/227 |
| 2,210,754 | 8/1940 | Frank | 15/227 |
| 2,234,670 | 3/1941 | Fiandach | 15/227 |
| 2,424,680 | 7/1947 | Doyle | 2/49 |
| 2,497,749 | 2/1950 | Wagner | 2/16 |
| 3,032,773 | 5/1962 | Piazze | 2/49 |
| 3,264,188 | 8/1966 | Gresham | 167/84 |
| 3,329,985 | 7/1967 | Glowacki, Jr. | 15/104 |
| 3,359,149 | 12/1967 | Hummel | 2/49 |
| 3,608,708 | 9/1971 | Storandt | 206/46 R |
| 3,638,789 | 2/1972 | Tuszewski | 206/63.2 R |
| 3,777,328 | 12/1973 | Kaplan | 15/104.94 |
| 3,780,908 | 12/1973 | Fitzpatrick et al. | 221/48 |
| 3,806,260 | 4/1974 | Miller | 401/7 |
| 3,967,756 | 7/1976 | Banish | 221/63 |
| 4,071,921 | 2/1978 | Jury | 15/227 |
| 4,100,324 | 7/1978 | Anderson et al. | 428/288 |
| 4,219,129 | 8/1980 | Sedgwick | 221/63 |
| 4,349,288 | 9/1982 | Bond | 401/7 |
| 4,522,967 | 7/1985 | Sheldon et al. | 524/377 |
| 4,523,348 | 7/1985 | Petrie | 15/227 |
| 4,534,491 | 8/1985 | Norton et al. | 221/63 |
| 4,567,065 | 1/1986 | Schneiderman | 427/230 |
| 4,797,967 | 1/1989 | Lengers | 15/227 |
| 4,865,221 | 9/1989 | Jackson et al. | 221/48 |
| 4,902,283 | 2/1990 | Rojko et al. | 604/290 |
| 4,937,881 | 7/1990 | Heise | 2/16 |
| 4,953,250 | 9/1990 | Brown | 15/104.94 |
| 4,964,188 | 10/1990 | Olson | 15/227 |
| 5,008,969 | 4/1991 | Jarrett | 15/227 |
| 5,019,058 | 5/1991 | Storandt | 604/290 |
| 5,368,188 | 11/1994 | Twardowski | 221/48 |

FOREIGN PATENT DOCUMENTS

| | | |
|---|---|---|
| 0032793A2 | 7/1981 | European Pat. Off. |
| 2108921 | 5/1983 | United Kingdom |
| 92/13713 | 8/1992 | WIPO |

*Primary Examiner*—Kenneth Noland
*Attorney, Agent, or Firm*—Douglas L. Miller

[57] ABSTRACT

A reusable dispenser and a plurality of disposable mitt wipes contained therein. The dispenser includes a tub body having a tub interior and a tub opening, a lid member joined to the tub body and being movable between a closed position and an open position, a sealing means between the lid member and the tub body, and a positive latching device for latching the lid member to the tub body. The lid member includes a replaceable access strip member that permits the mitt wipes to be dispensed one at a time, and is replaceable to close and seal the opening.

28 Claims, 6 Drawing Sheets

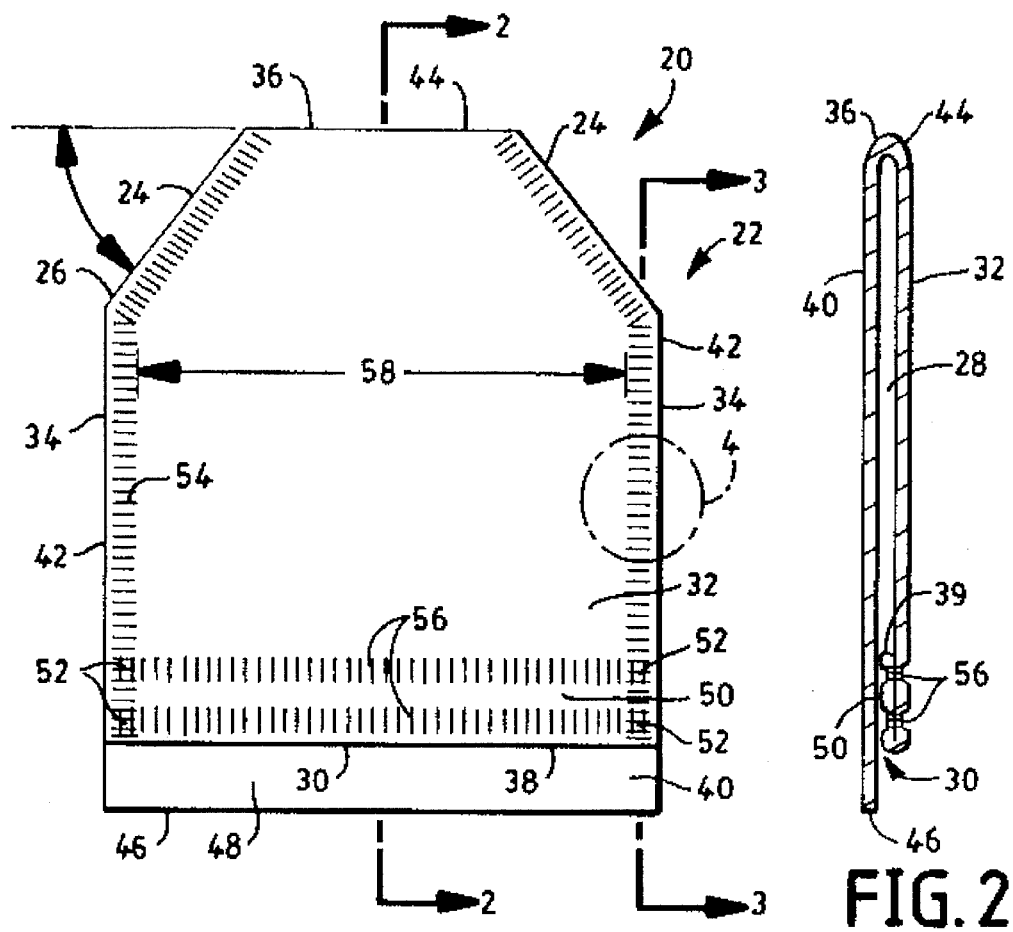
FIG. 1
FIG. 2
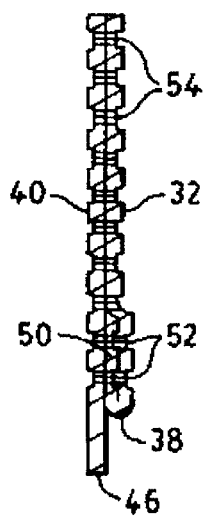
FIG. 3
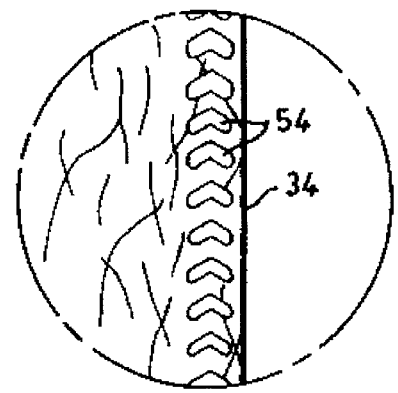
FIG. 4

5,542,566

REUSABLE DISPENSER AND A PLURALITY OF DISPOSABLE CHILD MITT WIPES CONTAINED THEREIN

BACKGROUND OF THE INVENTION

The present invention relates to dispensers and articles contained therein, and more particularly to a reusable dispenser and a plurality of disposable child mitt wipes contained therein.

From birth to an age of about two years old, a little boy or girl will wear diapers until he or she is ready for the toilet training process. Some children may start the toilet training process as early as the age of fifteen months, while others may not be ready until after the age of two. The age at which a child will begin this training process is dependent upon many factors, some of which are psychological, some physiological, and some unique to each individual child.

The total toilet training process embraces a number of aspects, some of which may or may not apply to each child. One aspect of the total toilet training process is the change from diapers to training pants to help the child understand that he or she may now more easily use the toilet, just like grownups.

Another aspect of the total toilet training process includes parental or caregiver instruction as a positive encouragement and reinforcement to the child that he or she should now be using the toilet, instead of using diapers or the like. Related to parental or caregiver instruction can be the use of written materials oriented to children at this particular age.

Still another aspect of the total toilet training process includes the examples of older brothers or sisters that have already proceeded successfully through this process. Generally, the younger untrained brother or sister will want to imitate the older trained brother or sister.

Yet another aspect of the total toilet training process includes cleanup after going to the toilet, especially after a bowel movement. In this case, parents or caregivers will desire that their children eventually become independent in cleaning themselves after going to the toilet. This means that two areas must be addressed by both the parents, or caregivers, and the child; one is how the child cleans up, and the other is how well the child cleans up.

In addressing the cleanup aspect of toilet training, parents or caregivers will usually first introduce their child to conventional bathroom tissue, i.e., toilet paper. Although it is understandable that the use of toilet paper may be the first method attempted by parents or caregivers to assist their child in cleaning up, it poses numerous problems for the child. One problem is that the tissue, of which the toilet paper is made, may not be strong enough to withstand the use by a child. If the child uses too little toilet paper, the toilet paper can tear or puncture during use, resulting in a mess on the child and anything within reach of the child. This presents sanitary problems, and can be a discouragement and frustration to the child by not being able to independently clean himself or herself after going to the toilet.

Another problem associated with conventional toilet paper is that children tend to pull too much toilet paper off of the roll. A bathroom that has its floor cluttered with excessive unrolled toilet paper can evoke less than encouraging or reinforcing words from the parent or caregiver.

Furthermore, if the child pulls too much toilet paper off of the roll, it is likely that the child will make a large ball of toilet paper, and attempt to clean himself or herself with it. This can result in less than efficient use of toilet paper, less than efficient cleanup, and quite possibly plugging of the toilet.

Another problem with conventional toilet paper is that it is more difficult for a child to manipulate the tissue to his or her bottom in order to clean. This is due to children's bodies being differently proportioned compared to adult bodies. More specifically, the child's arms may not be long enough to easily reach the cleanup area. Most children also do not have the necessary manual dexterity to overcome this particular problem. This problem is further magnified since the child cannot visually see the area he or she needs to cleanup.

With all of these problems associated with a child using toilet paper, it does not come as a surprise that assistance is required. For the child, this can be an embarrassment and humiliation in not being capable of adequately taking care of himself or herself. Furthermore, a child may, at this age, desire privacy and independence. This can be indicated when the child closes a bathroom door, when in the past an open door was never a concern. If the parent, or caregiver, needs to assist the child, there can be a conflict of emotion for the child that may be obstructive to the cleanup aspect of the toilet training process.

One attempt to address some of the above problems is to provide wipes specifically designed for use by children. These wipes are generally thicker than regular toilet paper, and usually only one wipe is supposed to be used. Although these wipes may be thicker and therefore not as prone to tear or puncture during use, they still present the problem associated with a flat, small wipe that is difficult for the child to manipulate or use in a correct manner. As with any unsuccessful attempt in cleanup, the child can become discouraged and the toilet training process may be delayed.

Another problem associated with children's wipes is that they can be perceived by the child as a "baby" wipe, as opposed to a grownup's bathroom tissue. Since the child wants to feel like a grownup who can independently cleanup, the use of a product perceived to be intended for babies can cause a child to refuse to use the wipe.

Important to encouraging a child to want to clean himself or herself, after going to the toilet, is that the child should have easy access to the wipes. Some wipes come in containers, as opposed to rolls, for various reasons. Some of these reasons include easy portability of the wipes when traveling out of the home, keeping the wipes moist if they have been so treated, or the like. For the child to be encouraged to use wipes in a container, the wipes should be easily dispensable. This means that the container lid should be easily opened by a child, bearing in mind that most children do not have an adult's manual dexterity. If the container is difficult to open, the child may have to hold the container in other than an upright position in order to open the lid, thereby resulting in the wipes possibly falling out of the container. This is a situation that can cause embarrassment and frustration to the child, and result in less than encouraging or reinforcing words from the parent or caregiver.

It now can be appreciated that the total toilet training process involves many aspects for both the child and the parent or caregiver. Some of these aspects affect children differently, or may not even be a factor for a particular child. It is this uniqueness of each individual child that presents a major challenge for both the child and the parent or caregiver. If any of these aspects are unsuccessful, the child's progress through the toilet training process can be unnecessarily delayed due to numerous failures and frustrations.

SUMMARY OF THE INVENTION

In one form of the present invention there is provided a dispenser and a plurality of mitt wipes, in which the dispenser includes a tub body having a continuous side wall and a bottom wall forming a tub interior and a tub opening. The continuous side wall includes a peripheral rim portion. A plurality of mitt wipes are contained in the tub interior. A lid member is hingedly joined to the tub body, and is movable between a closed position and an open position. The lid member includes a peripheral edge portion. A sealing mechanism between the peripheral rim portion and the peripheral edge portion seals the lid member against the continuous side wall, and a positive latching mechanism latches the lid member to the continuous side wall when in the closed position.

In another form of the present invention there is provided a dispenser and a plurality of mitt wipes, in which the dispenser includes a tub body having a continuous side wall, a bottom wall, and a top wall forming a tub interior. A plurality of mitt wipes are contained in the tub interior, and an access strip member in the top wall is removable to define an access opening through which the mitt wipes can be dispensed. A holding mechanism is provided for retaining the access strip member in the access opening.

In still another embodiment of the present invention there is provided a dispenser and a plurality of mitt wipes, in which the dispenser includes a tub body having a continuous side wall and a bottom wall forming a tub interior and a tub opening. The continuous side wall includes a peripheral rim portion. A plurality of mitt wipes are contained in the tub interior, and a lid member is hingedly joined to the tub body and is movable between a closed position and an open position. Each mitt wipe includes a mitt body having an interior space and an opening. An access flap member is at the mitt opening and extends outwardly therebeyond, and a reinforcing cuff member is at the mitt opening and is bonded to the mitt body.

BRIEF DESCRIPTION OF THE DRAWINGS

The above-mentioned and other features and objects of this invention and the manner of attaining them will become more apparent, and the invention itself will be better understood by reference to the following description of the invention taken in conjunction with the accompanying drawings, wherein:

FIG. 1 illustrates a top plan view of one embodiment of a child mitt wipe;

FIG. 2 illustrates a cross-sectional view of FIG. 1 taken along line 2—2 and viewed in the direction of the arrows;

FIG. 3 illustrates a cross-sectional view of FIG. 1 taken along line 3—3 and viewed in the direction of the arrows;

FIG. 4 illustrates an enlargement of the encircled area in FIG. 1;

DETAILED DESCRIPTION

Figure 7:
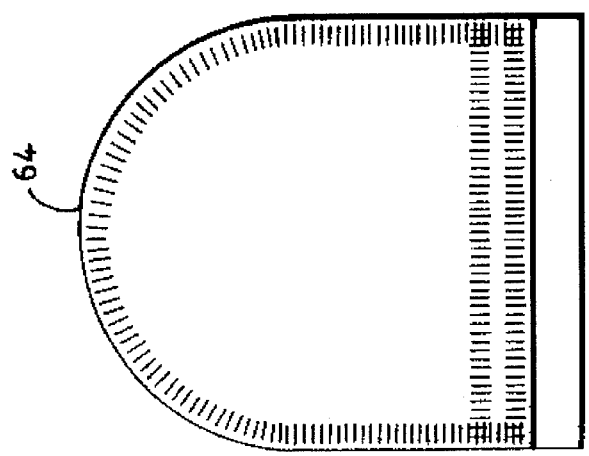
FIGS. 5–7 illustrate modifications of the embodiment in FIG. 1.

Referring primarily to FIG. 1, there is illustrated one embodiment of a mitt wipe 20 in accordance with the principles of the present invention. Mitt wipe 20 is desirably disposable and flushable. The term "disposable" means that the mitt wipe 20 is to be used once for its intended purpose and thereafter discarded, not to be used again. The term "flushable" means that after the mitt wipe has been used for its intended purpose, it can be flushed in a toilet. Although the following description is with reference to children, the mitt wipe of the present invention can be designed for the elderly, the physically challenged, or the like.

Mitt wipe 20 comprises a mitt body 22 which includes tapered upper portions 24, a periphery 26, an interior space 28 (FIG. 2) for accommodating the hand of a child, and a mitt opening 30 through which the child can place his or her hand. Mitt body 22 further comprises a top layer 32 and a bottom layer 40. Top layer 32 includes opposed sides 34, top end 36, and bottom end 38. Similarly, bottom layer 40 includes opposed sides 42, a top end 44, and a bottom end 46. As can be seen in FIG. 1, both sides 34 of top layer 32 and sides 42 of bottom layer 40 have tapering upper portions corresponding to tapered upper portions 24 of mitt body 22.

An access flap member 48 is associated with bottom layer 40 and extends outwardly beyond (in a downward direction as viewed in FIG. 1) bottom end 38 of top layer 32. Access flap member 48 is "associated" with bottom layer 40 in that access flap member 48 can be an extension of bottom layer 40, or can be a separate structural element attached to bottom layer 40 such that it extends beyond bottom end 38. In this particular embodiment, access flap member 48 is an extension of bottom layer 40, and is thus made of the same material as bottom layer 40.

A reinforcing cuff member 50 is associated with top layer 32, so as to provide at least two layers of material at mitt opening 30. As illustrated in FIG. 2, reinforcing cuff member 50 is constructed as a folded portion of top layer 32, and is folded inwardly toward interior space 28. Reinforcing cuff member 50 may also be formed from top layer 32 by being folded outwardly, or may be a separate structural element. In this embodiment, reinforcing cuff member 50 is a folded inwardly portion of top layer 32, and has a cuff end 39 disposed within interior space 28.

Continuing to refer to FIG. 1, a peripheral bond line 54 joins top layer 32 and bottom layer 40. Peripheral bond line 54 does not bond the total periphery 26 of mitt body 22, but only those edge portions of top layer 32 and bottom layer 40 that must be bonded in order to form interior space 28 and mitt opening 30. In FIG. 1, peripheral bond line 54 extends along sides 34 of top layer 32 and sides 42 of bottom layer 40. The top ends 36 and 44 are not bonded since, in this embodiment and as will be fully described hereafter, mitt body 22 is formed from a layer of material that is folded on itself, appropriately bonded, and then cut in order to form an individual mitt body 22. If desired, both top and bottom layers 32, 40 can be separate structural elements that are bonded, not only along their mutually facing sides 34, 42, but also along their mutually facing top ends 36, 44.

Reinforcing cuff member 50 is bonded to top layer 32 across its width, i.e., a left-to-right direction as viewed in FIG. 1. FIGS. 1–2 illustrate the bond between top layer 32 and reinforcing cuff member 50 as two parallel bond lines 56.

In designing mitt wipe 20 of the present invention, it was discovered that, in use, the corners or end portions between top and bottom layers 32, 40 adjacent mitt opening 30 can tear due to the rough handling by a child. Once a tear is initiated at these corners, the tear would generally propagate along peripheral bond line 54, thereby destroying the structure of mitt wipe 20 and frustrating its user. In order to prevent this tearing or rupturing at these corners, opposite end portions 52 of reinforcing cuff member 50 are bonded to top layer 32 and bottom layer 40. FIG. 3 illustrates this bonding of reinforcing cuff member 50, top layer 32, and bottom layer 40. As illustrated in FIG. 3, it is to be understood that top layer 32 and bottom layer 40 are joined, connected, or bonded together, even though reinforcing cuff member 50 is positioned between them. Reinforcing cuff member 50 thus reinforces mitt opening 30 (FIG. 2) at that area of mitt body 22 corresponding to opposite end portions 52 (FIG. 1) by the overlapping of peripheral bond line 54 and parallel bond lines 56.

Reinforcing cuff member 50 also serves other purposes in the present invention. One of these is to help the child identify mitt opening 30, thereby assisting the child in properly using the mitt wipe 20. Another purpose is to allow the child to more easily separate top layer 32 and bottom layer 40, particularly when a desired solution has been applied. For a child with a limited amount of manual dexterity, separating two layers of equal thickness that are pressed flat together can be extremely difficult. Reinforcing cuff member 50 thus not only identifies mitt opening 30 for the child, but also provides extra thickness to top layer 32, thereby minimizing the difficulty in separating top and bottom layers 32, 40 at mitt opening 30.

The cleanup aspect of the toilet training process is aided by reinforcing cuff member 50, which maintains the structural integrity of mitt opening 30, helps identify mitt opening 30 to the young child, and assists the child in separating top and bottom layers 32, 40 so that the child can place his or her hand into interior space 28 of mitt body 22. These three features have been found to be very useful and helpful in encouraging a child during the cleanup aspect of the training process.

Parallel bond lines 56 also serve to assist the child in visually identifying which end of mitt wipe 20 he or she should open in order to properly put on mitt wipe 20. Further, bond lines 56 serve to stiffen reinforcing cuff member 50 in order to further minimize the difficulty in separating top and bottom layers 32, 40 at mitt opening 30. It has been found that two layers will be easier to separate by a child when they have different thicknesses, and/or when they have different stiffness. The purpose and value of reinforcing cuff member 50 should not be underestimated in assisting and encouraging a child in the use of mitt wipe 20 in his or her cleanup after going to the toilet.

Although bond lines 56 have been described and illustrated as two parallel bond lines, one or more than two bond lines can be utilized. The number of bond lines will be dependent upon several factors, such as the physical characteristics of the material of which mitt body 22 is made, the type of bonding that forms bond lines 56, or the like.

Access flap member 48 (FIG. 1) is also important, along with reinforcing cuff member 50, in the proper fitting and use of mitt wipe 20. As with reinforcing cuff member 50, access flap member 48 assists the child in properly identifying mitt opening 30 and in easily and properly placing mitt wipe 20 over the hand. This is particularly useful when mitt body 22 includes a solution that tends to adhere top and bottom layers 32, 40 together, and also when there are a plurality of mitt wipes 20 stacked or interfolded together.

Referring to FIG. 1, tapered upper portions 24 of mitt body 22 provide a geometric form to mitt body 22 that better fits the outline of a child's hand, thereby assisting the child in properly fitting mitt wipe 20 on his or her hand. Proper fitting of mitt wipe 20 is a significant factor in encouraging the child to want to use mitt wipe 20, and in helping the child to use mitt wipe 20 properly in the cleanup process. Tapered upper portions 24 are cut or formed such that they form an angle with the horizontal, i.e., a left-to-right direction as viewed in FIG. 1, between about 20 degrees to about 60 degrees. This range is provided since children have different size hands. Accordingly, the mitt wipes 20 can be provided in different sizes, both in length and width, in order to accommodate a range of hand sizes. However, if it is desired to have one size mitt wipe 20, a desired range of angles for tapered upper portions 24 is between about 35 degrees to about 45 degrees.

The material of which mitt body 22 is made is important in the cleanup aspect of the toilet training process. The material should be strong enough to resist tearing during normal use, yet still provide softness to the child's tender skin. One desired material is a composite material comprising a mixture of natural fibers and synthetic fibers. A desired natural fiber is a cellulosic fiber, and a desired synthetic fiber is a polypropylene fiber. These fibers can be suitably mixed in a meltblowing process in which the polypropylene fibers are meltblown into a stream of cellulosic fibers. In one desired method of meltblowing the polypropylene, the resulting microfibers have an average diameter of up to only about 10 microns with very few, if any, of the microfibers exceeding 10 microns in diameter. The average diameter of the microfibers is usually greater than about 1 micron, and is desirably within the range of about 2 to about 6 microns, with an average of about 5 microns. While the microfibers are predominantly discontinuous, they generally have a length exceeding that normally associated with staple fibers. The stream of individualized cellulosic fibers typically have a length of about 0.5 to about 10 millimeters and a length-to-maximum-width radio of about 10:1 to 400:1. A typical cross-section has an irregular width of about 30 microns and a thickness of about 5 microns.

The meltblowing of synthetic fibers into a stream of cellulosic fibers results in an intimate mixture of cellulosic fibers and polymeric microfibers integrated by physical entrapment and mechanical entanglement, while suspended in space during the meltblowing process. Because the microfibers are longer, thinner, limper, and more flexible than the cellulosic fibers, the microfibers twist around and entangle the relatively short, thick, stiff cellulosic fibers as soon as the fiber streams merge. This entanglement interconnects the two different types of fiber with strong, persistent inter-fiber attachments without any significant molecular, adhesive, or hydrogen bonds. In the resulting mixture or matrix, the microfibers retain a high degree of flexibility, with many of the microfibers being spaced apart by entanglement with the comparatively stiff cellulosic fibers. The entangled cellulosic fibers are free to change their orientation when the matrix is subjected to various types of distorting forces, but the elasticity and resiliency of the microfiber network tends to return the cellulosic fibers to their original positions when the distorting forces are removed. A coherent integrated fiber structure is thus formed by the mechanical entanglement and interconnection of the two different fibers.

The microfibers and the nature of their anchorage to the cellulosic fibers provide yielding "hinges" between the fibers in the final structure. The fibers are not rigidly bonded to each other, and their connection points permit fiber rotation, twisting, and bending. At even moderate microfiber content, the structure is capable of providing cloth-like properties of "hand" and "drape," and is conformable while retaining a degree of elasticity and resiliency. Even when wet, such as with water, which softens the cellulosic fibers, the material exhibits flexural resiliency and a wet strength comparable to its dry strength. All of these properties are important in providing the desired tear-strength and softness to mitt wipe 20.

It should also be understood that this containment of the cellulosic fibers, and the other characteristics noted above, are achieved in the air-formed material without the addition of adhesives and without any further processing or treatment. Because of the intended use of mitt wipe 20 by a young child, it is desirable that as few additives as necessary are used.

A wide variety of thermoplastic polymers are useful in forming the meltblown microfibers, so that the material can be fashioned with different physical properties by the appropriate selection of polymers or combinations thereof. Among many useful thermoplastic polymers are polyolefins, such as polypropylene and polyethylene, polyamides, polyesters such as polyethylene teraphthalate, and thermoplastic elastomers such as polyurethanes.

One method of measuring tear strength is the determination of the breaking length of the material. This tensile strength test can be conducted with an Instron tester (Model No. A70) using a material sample 1.0 inch (2.54 centimeters) wide and 3.0 inches (7.62 centimeters) long (a longer sample can be used, but only a length of 3 inches (7.62 centimeters) is to be exposed between the jaws of the tester). The sample can be loaded at a rate of 10 inches (25.4 centimeters) per minute at 70°–72° F. (21°–22° C.) and at 40–50 percent relative humidity. The measured tensile strength is divided by the basis weight of the sample to give the breaking length. To measure the wet breaking length, the sample is immersed in water for 30 seconds and then laid on a blotter to remove excess water before testing. To measure redried breaking length, the sample is wetted and then air dried before testing.

A more detailed explanation of the meltblowing process and the materials made thereby can be found in U.S. Pat. No. 4,100,324 issued Jul. 11, 1978, and assigned to the assignee of the present application, the contents of which are incorporated by reference herein.

When using this type of material, it is desired that the natural fibers be present in an amount between about 80 percent to about 55 percent by weight of the total weight of the material, and the synthetic fibers present in an amount between about 20 percent to about 45 percent by weight of the total weight of the material. In a desired embodiment, the cellulosic fibers are present in an amount of about 65 percent by weight of the total weight of the material, and the polypropylene fibers are present in an amount of about 35 percent by weight of the total weight of the material.

It is also desired that the basis weight of the material be in the range of about 50 grams per square meter to about 100 grams per square meter, with a desired basis weight of about 75 grams per square meter.

Mitt body 22 can be made of an all natural fiber material, such as cellulosic fibers, cotton linters, rayon, flax, or the like, or of an all synthetic fiber material, such as polypropylene fibers, polyester fibers, and polyethylene fibers. Still other types of synthetic fibers include water-soluble or water-dispersible polymers, such as polyethyloxazoline, polyethylene oxide, polyvinyl acetate, polyvinyl alcohol, water-dispersible acrylic polymers, starch polymers, or the like.

It may be desirable to include a solution with the material of mitt body 22. Some of the desired features of an appropriate solution are the moisturizing of the child's skin, improved cleaning of the child's skin, and keeping the mitt wipe 20 clean and fresh prior to use. One desirable solution is that used in the commercially available wipes under the trade designation KLEENEX® HUGGIES® Baby Wipes.

One advantage of using synthetic fibers in mitt body 22 is that the synthetic fibers permit the material of mitt body 22 to be ultrasonically bonded, as opposed to being adhesively bonded. This is particularly advantageous when a solution is used with mitt body 22. If an adhesive substance is used to bond the material together in order to form mitt wipe 20, there is concern that a potential chemical interaction between the adhesive substance and the solution could negatively affect the solution. By ultrasonically bonding materials together, the problem of potential chemical interaction can be eliminated. Other advantages of ultrasonically bonding the material are the material's shelf life being extended, and the use of higher manufacturing speeds, compared, for example, to the application of hot melt adhesive.

As viewed in FIG. 4, a preferred ultrasonic bond is a chevron pattern that provides better resistance to tearing than straight-line bonding. It is also desired that the pattern include a minimum of 8 bonds per lineal inch, naturally assuming that the bond line is not a continuous bond line.

Ultrasonic bonding is a type of fusion bonding in which the adhering or cohering mechanism is provided by the materials involved in the process. For example, with the composite material described above, it is the synthetic fibers that provide the bonding between the layers of material. Other examples of fusion bonding include thermal bonding or heat bonding.

Another type of bonding suitable for the present invention is mechanical bonding such as for example, hydroentangling, crimping, embossing, and needle punching. These methods are particularly suitable for bonding materials made of all natural fibers.

These methods of bonding do not require a third agent, such as an adhesive that can negatively affect or neutralize a solution in the material of which mitt body 22 is made, in order to join the layers together.

With reference to the bonding used in constructing mitt wipe 20, it is desired that the tear strength of the bonding, for example, peripheral bond line 54, be greater than or equal to the tear strength of the material of which mitt body 22 is made.

It was earlier described that mitt wipe 20 (FIG. 1) can be manufactured in various sizes. A desired mitt wipe 20 has a length, as measured between bottom end 46 and top end 44, of about 5.25 inches (13.3 centimeters), and a total width between sides 34 of about 4.5 inches (11.4 centimeters). The length of access flap member 48, measured between bottom ends 38, 46, is desired to be about 0.5 inch (1.3 centimeters), as is the desired length of reinforcing cuff member 50, as measured between bottom end 38 and cuff end 39 (FIG. 2) of reinforcing cuff member 50. An important dimension of mitt wipe 20 is the inside width of interior space 28 between the parallel portions of peripheral bond line 54. This measurement is taken between the parallel portions of sides 42 in a direction generally transverse to peripheral bond line 54. In FIG. 1, this measurement is between the innermost portions of bond line 54, as indicated by numeral 58. This minimum desired width of interior space 28 is equal to or greater than about 4 inches (10.2 centimeters). It has been discovered that this width corresponds to a mitt opening 30 having a perimeter that best permits the child's hand to reach into interior space 28, so that the child's hand does not apply too great of a stress along the bonded portions, such as along peripheral bond line 54, and specifically at end portions 52 of reinforcing cuff member 50. This minimum width dimension allows the child to easily put on and take off mitt wipe 20, while maintaining the mitt wipe 20 properly on the hand, i.e., preventing rotation or slipping of the mitt wipe 20 on the hand. Any rotation or slipping, or any other action that causes improper fit, will negatively impact both the cleaning process and the toilet training process of the child.

Figure 6:
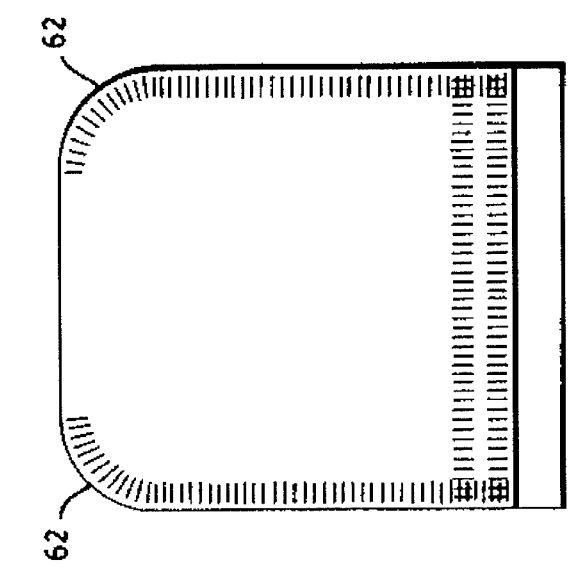
Figure 5:
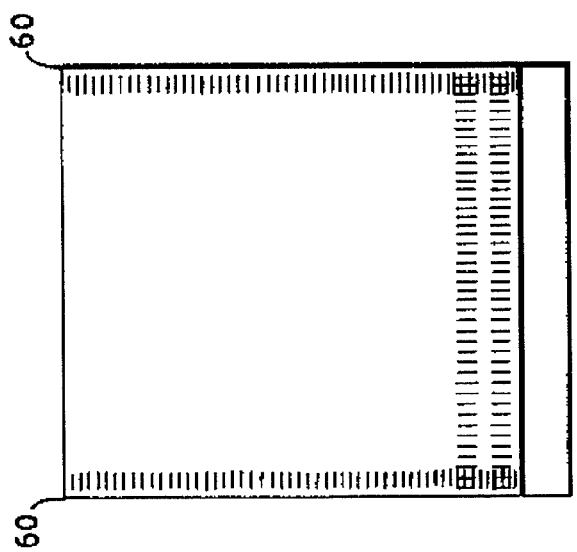

FIGS. 5–7 illustrate other modifications to mitt wipe 20. In FIG. 5, there are no tapered upper portions 24. They have been replaced with squared upper portions 60, in which "squared" refers to an angle of about 90 degrees. FIG. 6 illustrates a modification in which tapered upper portions 24 have been replaced with curved upper portions 62, and FIG. 7 illustrates a modification in which tapered upper portions have been replaced with a fully rounded upper portion 64 and in which top and bottom layers 32, 40 (FIG. 2) are separate structural elements joined together as earlier described. Although not illustrated, the present invention contemplates other modifications to the design of mitt wipe 20.

Figure 8:
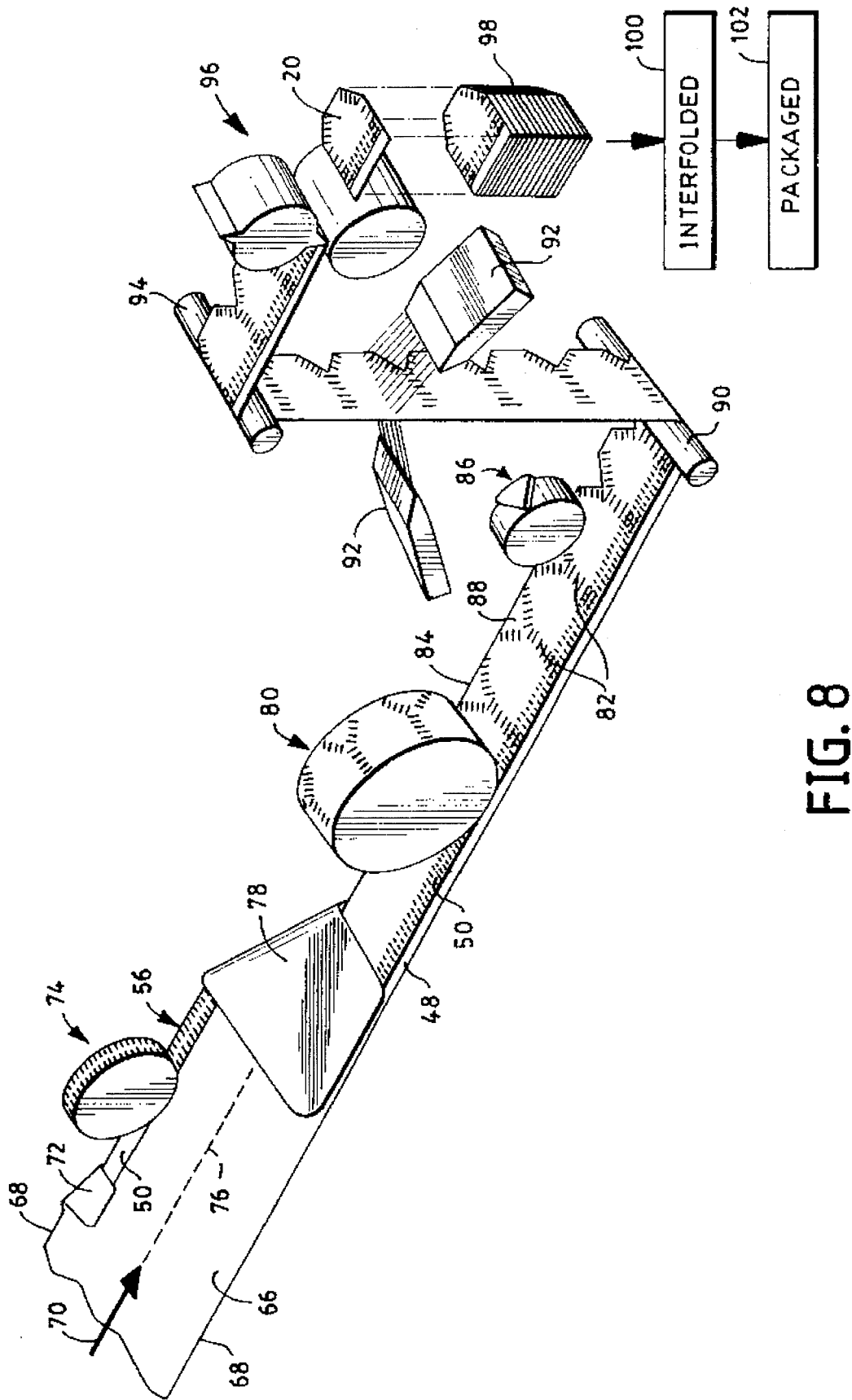
FIG. 8 illustrates a schematic view of one process for making the embodiment in FIG. 1.

One process of making a child mitt wipe 20 is illustrated in FIG. 8 in which a continuously moving material 66 including opposed sides 68 is continuously moved in a first direction indicated by arrow 70. Material 66 is folded by folding board 72, thereby providing a continuous reinforcing cuff member 50, and then proceeds to a rotary ultrasonic bonder 74 that ultrasonically bonds reinforcing cuff member 50 to material 66, thereby providing continuous bond line 56. Thereafter, a folding board 78 folds material 66 along a fold line 76 to form a continuous access flap member 48. Once folded along fold line 76, material 66 proceeds to rotary ultrasonic bonder 80 for intermittently ultrasonically bonding material 66 with a generally Y-shaped bond pattern 84. Thereafter, a contour cutter 86 trims portions 88 from material 66; portions 88 being the top portions of the generally Y-shaped bond pattern 84. Once trimmed, material 66 proceeds to turning bar 90 which turns or moves material 66 in a generally vertical direction to applicator system 92. Applicator system 92 then applies, if desired, a solution to material 66. Because of the vertical orientation of material 66, any excess solution moves by gravity downwardly towards material 66 that is yet to be sprayed by applicator system 92. After applying a solution to material 66, it proceeds to a turning bar 94 that moves material 66 towards a cutting station 96 which cuts material 66 along locations 82, thereby forming a plurality of mitt wipes 20. Thereafter, the mitt wipes 20 proceed to a stacking station 98 for stacking, or alternatively to an interfolding station 100 for interfolding the individual mitt wipes 20 prior to being stacked. Thereafter, the mitt wipes 20 proceed to packaging station 102 for suitable packaging.

Figure 9:
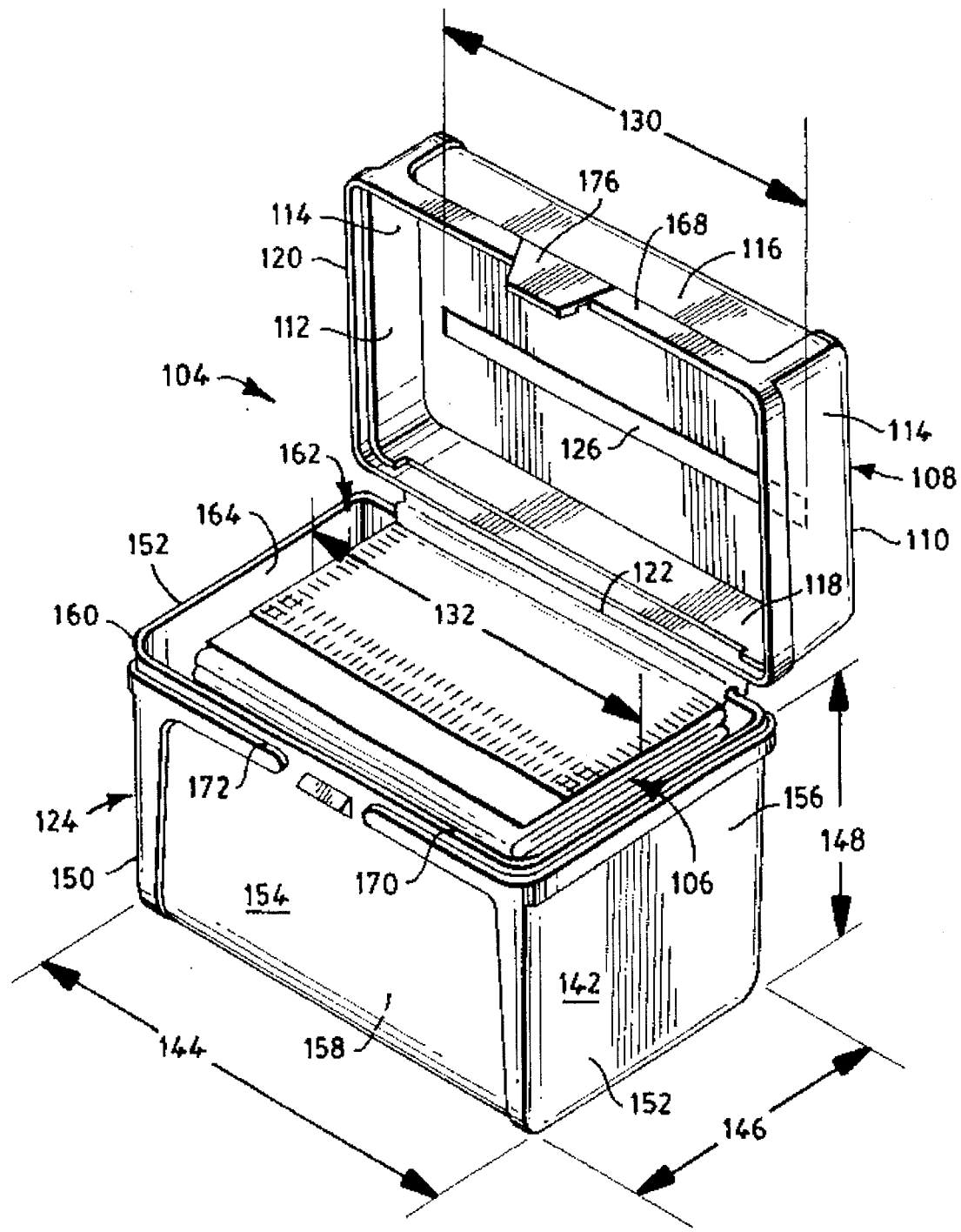
FIG. 9 illustrates a perspective view of one embodiment of a dispenser and interfolded mitt wipes therein.
Figure 11:
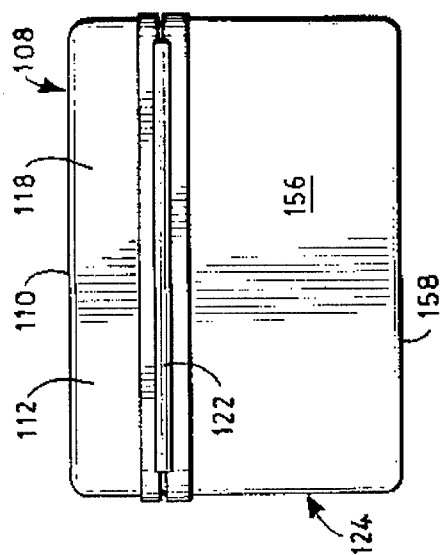
FIG. 11 illustrates a back elevational view of the embodiment in FIG. 9.
Figure 12:
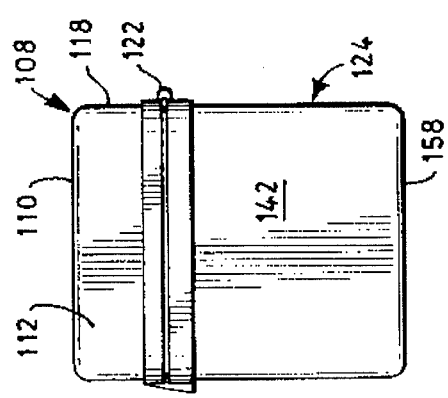
FIG. 12 illustrates an end elevational view of the embodiment in FIG. 9.

Referring now to FIGS. 9–13, a dispenser 104 is illustrated containing therein a plurality of interfolded mitt wipes 106. Hereafter, the numeral 106 is used to designate a plurality of interfolded mitt wipes in dispenser 104, and a single mitt wipe to be dispensed from dispenser 104. Dispenser 104 is desirably reusable, so that once mitt wipes 106 have been depleted, a new supply of mitt wipes 106 can be placed in dispenser 104. Generally, dispenser 104 can be reused indefinitely as long as proper care is taken to prevent it from becoming broken, bent, cracked, or otherwise unusable. As illustrated in FIG. 9, mitt wipes 106 are interfolded in that each mitt wipe 106 is folded in half and then appropriately mated or nested with a similarly folded mitt wipe 106. This permits each mitt wipe 106, upon being removed from dispenser 104, to pull the next mitt wipe 106 into a position so that it can be easily removed. The present invention also contemplates that mitt wipes 106 can be folded in any other manner, such as a fold greater or less than a half fold, or can be unfolded and laid flat, one upon the other.

Figure 10:
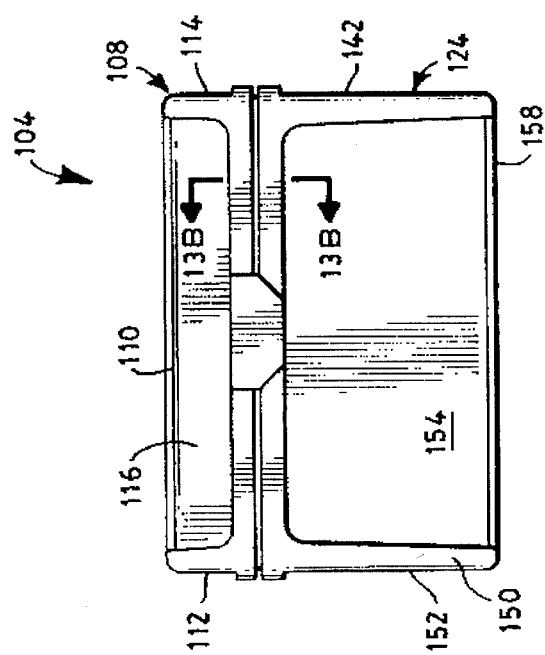
FIG. 10 illustrates a front elevational view of the embodiment in FIG. 9.

Dispenser 104 (FIG. 9) comprises a lid member 108 that is hingedly joined to a rigid, flexible tub body 124. Lid member 108 (FIGS. 9 and 13) includes a top wall 110 and a continuous side member 112 which extends outwardly from top wall 110. Generally, top wall 110 and continuous side member 112 will form an angle between about 80 degrees to about 100 degrees with each other. Continuous side member 112 includes opposite side members 114 (FIG. 9), a front member 116, a back member 118, and a peripheral edge portion 120 (FIGS. 13A–B). A hinge portion 122 joins lid member 108 to tub body 124, so that lid member 108 can be moved between an open position, as illustrated in FIG. 9, and a closed position, as illustrated in FIG. 10.

Figure 13:
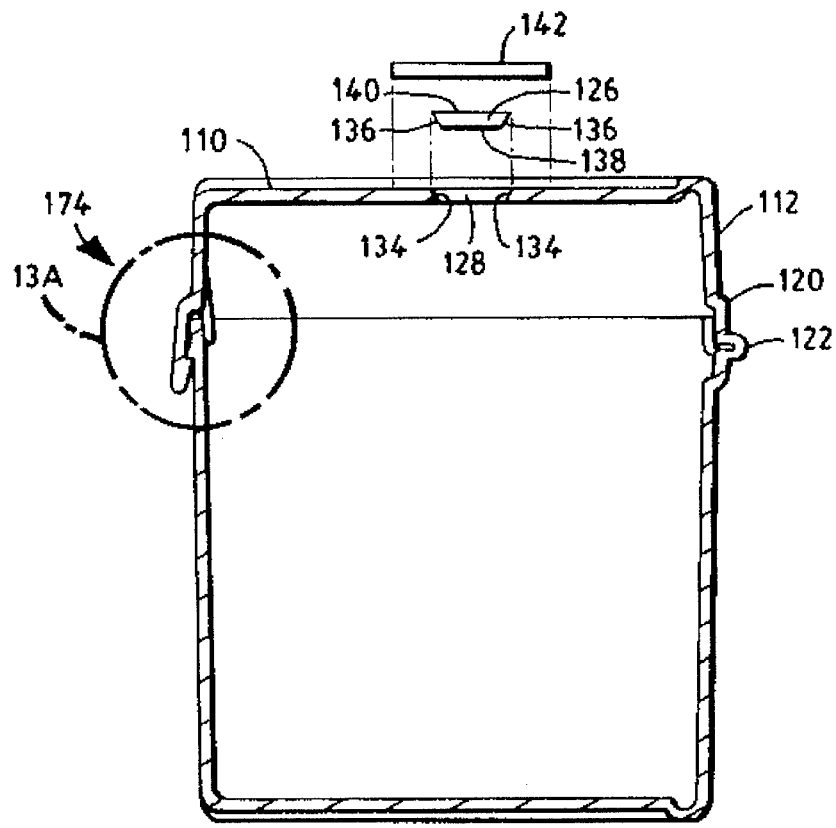
FIG. 13 illustrates a partially exploded, cross-sectional view of the embodiment in FIG. 12.
Figure 13A:
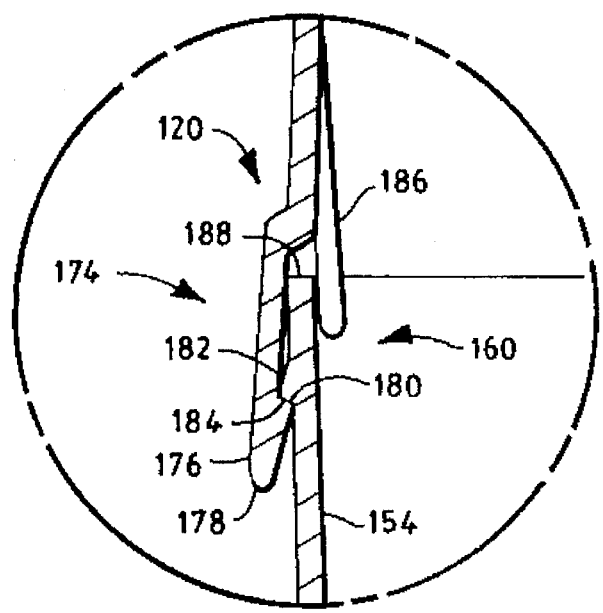
FIG. 13A illustrates an enlargement of the encircled area in FIG. 13.
Figure 13B:
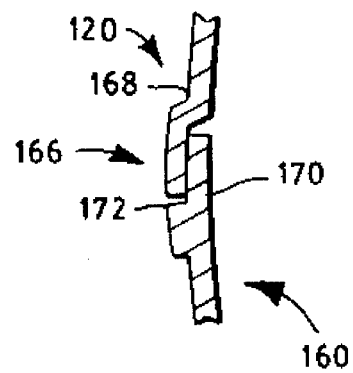
FIG. 13B illustrates a cross-sectional view of FIG. 10 taken along line 13B—13B and viewed in the direction of the arrows.

In FIGS. 9 and 13, an access strip member 126 is constructed in top wall 110, and is removable and replaceable therefrom so as to define an access opening 128. As will be described hereafter, an individual mitt wipe 106 can be dispensed through access opening 128, which has a length 130 (FIG. 9) greater than a length 132 of mitt wipes 106. Access strip member 126, upon being removed, defines access opening 128 having tapering sides 134 (FIG. 13). Access strip member 126 comprises tapering sides 136, a bottom side 138, and a top side 140. Desirably, top side 140 is, when access strip member 126 is properly positioned in access opening 128, generally coplanar with the uppermost surface of top wall 110 of lid member 108. Tapering sides 134, 136 are complementary surfaces such that they are in mutually facing contact when access strip member 126 is properly positioned in access opening 128. The complementary fit of tapering sides 134, 136 provides the features of inhibiting the evaporation or separation of a solution applied to mitt wipes 106, and of preventing access strip member 126 from falling inside tub body 124.

Access strip member 126 is removable and replaceable, as necessary according to the desires of the user, and is maintained in its position in access opening 128 by an appropriate holding means 142, which in this embodiment is a suitable release tape that can be re-adhered numerous times to top wall 110 of lid member 108. Holding means 142 prevents access strip member 126 from accidentally falling out, and further inhibits the evaporation or separation of a solution from mitt wipes 106. If desired, holding means 142 can keep access strip member 126 joined to lid member 108 when removed, so that access strip member 126 does not become lost. This can be accomplished in any suitable manner, such as with a string member or other structure that keeps access strip member 126 from totally separating from lid member 108.

The purpose and function of lid member 108 is important to the desired performance of dispenser 104 in properly dispensing mitt wipes 106. Dispenser 104 comprises a tub body 124 that acts in cooperation with lid member 108 to provide a dispenser that can be easily used by a child going through the toilet training stage. In this respect, the length, width, and height of dispenser 104 are important in insuring a child can easily hold dispenser 104 while easily dispensing a single mitt wipe 106 therefrom. Some conventional containers for containing wet wipes, or the like, are larger and/or cumbersome in that they require the child to use two hands to hold the containers, thereby making it difficult for the child both to hold the container and to easily dispense a single wipe 20 therefrom.

Referring to FIG. 9, dispenser 104 has a length 144, a width 146, and a height 148. One set of desired dimensions for dispenser 104 is a length between about 4 to about 5 inches (10.2–12.7 centimeters), a width between about 2.5 to about 3.5 inches (6.4–8.9 centimeters), and a height between about 3 to about 4 inches (7.6–10.2 centimeters). In order for a child to properly and easily handle dispenser 104 and the plurality of mitt wipes 106 therein, it is important that at least either the length 144 or width 146 have a dimension equal to or less than about 4 inches (10.2 centimeters). It has been discovered that children passing through the toilet training stage can vary in age generally between about two years old and about five years old. In this particular age range, the body can grow dramatically, such that a two-year-old child may only have half the hand span as he or she will have at the age of five. It is important, therefore, that children with smaller hand spans are able to dispense a mitt wipe 106 as easily as older children with greater hand spans. It has been determined that a length or width dimension equal to or less than about 4 inches (10.2 centimeters) allows most any child in this age range to easily and firmly grasp dispenser 104 in one hand, so that mitt wipes 106 can be easily dispensed therefrom with the other hand. If the child is required to handle and manipulate dispenser 104 with both hands, then it will be very difficult to dispense mitt wipes 106 one at a time, and this is particularly so if mitt wipes 106 include a solution. It is important to both the parent, or caregiver, and child that the child not be discouraged or frustrated during this very sensitive and important stage of his or her maturing process.

Still referring to FIG. 9, tub body 124 comprises a continuous side wall 150 defined by opposite side walls 152, a front wall 154, a back wall 156, and a bottom wall 158. Continuous side wall 150 further includes a peripheral rim portion 160 (FIGS. 13A–B), and defines a tub interior 162 and a tub opening 164.

Referring to FIGS. 13–13B, a sealing means 166 (FIG. 13B) between peripheral edge portion 120 and peripheral rim portion 160 serves to properly position lid member 108 (FIG. 9) over tub opening 164 (FIG. 9) and to inhibit the separation or evaporation of a solution applied to mitt wipes 106. Sealing means 166 includes a downwardly extending flange 168 (FIG. 13B) of peripheral edge portion 120, an upwardly extending flange 170 of peripheral rim portion 160, and a support surface 172 of peripheral rim portion 160. The terms "downwardly" and "upwardly" are to be read and understood with reference to FIGS. 13–13B. Regardless of the description of the orientation of flanges 168, 170, it is important that they provide complementary sealing edges about tub opening 164. In this respect, flanges 168, 170 can be totally peripherally arranged around lid member 108 and tub opening 164, respectively. Whether or not flanges 168, 170 are totally peripherally arranged depends upon the construction of hinge portion 122 (FIG. 9). For example, if hinge portion 122 directly joins the edges of lid member 108 and tub body 124, then flanges 168, 170 will stop at hinge portion 122. On the other hand, if hinge portion 122 is a strap-type hinge, i.e., a strap that overlaps the edges of lid member 108 and tub body 124, then flanges 168, 170 will be arranged around the total periphery of lid member 108 and tub opening 164. In any event, when lid member 108 is in the closed position, downwardly extending flange 168 and upwardly extending flange 170 mutually contact one another, with flange 168 resting on support surface 172, although not shown this way in FIG. 13B for purposes of explanation and understanding. Other constructions that provide a complementary fit between lid member 108 and tub body 124 are contemplated by the present invention.

Important to the construction of sealing means 166 (FIG. 13B) is that upwardly extending flange 170 is inwardly disposed of downwardly extending flange 168 relative to tub interior 162 (FIG. 9). Since dispenser 104 is desirably made of a rigid, but flexible material, when dispenser 104 is firmly grasped in the hand, continuous side wall 150 (FIG. 9) can flex inwardly at the point of applied force. This same force can also cause portions of continuous side wall 150 adjacent or near to the point of applied force to flex outwardly. This outwardly flexing can cause flange 170 to be forced against flange 168, thereby further securing lid member 108 in the closed position against tub body 124.

Referring to FIGS. 13–13A, a positive latching means 174 latches or locks lid member 108 to tub body 124. The term "positive latching" means that when positioned in the latched or locked position, the user will hear or feel a "snap" when the latching or locking occurs. This can be important to the child in properly using dispenser 104. The positive latching means 174 comprises an outer finger latch 176 extending downwardly, as viewed in FIG. 13, from peripheral edge portion 120 (FIG. 13A). The outer finger latch 176 includes a wedge-like tip 178 having a locking surface 180. A wedge-like extension 182 is formed or constructed on peripheral rim portion 160. Wedge-like extension 182 has a locking surface 184 that forcibly engages locking surface 180 when wedge-like tip 178 is snapped over wedge-like extension 182. At least one inner guide pin 186 extends downwardly and is spaced inwardly of outer finger latch 176 a distance sufficient to allow an upper end portion 188 of front wall 154 to slide therebetween. By moving upper end portion 188 between outer latch finger 176 and at least one inner guide pin 186, the locking surfaces 180, 184 are properly positioned so as to latch or lock together, and to maintain upper end portion 188 in a secure or firm position.

In most cases, the frequency of use of interfolded mitt wipes 106 (FIG. 9) will dictate whether or not lid member 108 is in the open or closed position, and whether or not access strip member 126 is positioned in access opening 128. For example, if mitt wipes 106 are going to be used frequently such that there is no or very little concern with a solution evaporating or separating from mitt wipes 106, then lid member 108 will be secured over tub opening 164 by means of positive latching means 174. Holding means 142 (FIG. 13) will then be activated, such as by removing a release tape, which will result in access strip member 126 being removed and exposing access opening 128. Thereafter, the uppermost interfolded mitt wipe 106 can be threaded through access opening 128, with lid member 108 then being placed in the closed position. Upon grasping the exposed mitt wipe 106 and pulling it through access opening 128, the interfolding of mitt wipes 106 will cause the next mitt wipe 106 to be pulled partially through access opening 128.

If a solution has been applied to mitt wipes 106, the mitt wipes 106 can tend to stick or adhere together such that the pulling upwardly or outwardly of a mitt wipe 106 from access opening 128 can cause dispenser 104 to also be lifted due to the strength of the adhesion between mitt wipes 106. This is why the dimensions of dispenser 104 are important to its proper use by a child. If the child cannot easily grasp dispenser 104 firmly with one hand in order to dispense a mitt wipe 106 with the other hand, then the child can become quickly discouraged with the cleanup process. However, in accordance with the present invention, the length 144 and/or width 146 has a dimension equal to or less than about 4 inches (10.2 centimeters), thereby permitting the child to easily and firmly grasp dispenser 104 with one hand, while dispensing a mitt wipe 106 with the other hand.

If instead of using interfolded mitt wipes 106 on a frequent basis, they will only be used infrequently, and there is a desire to ensure a solution, if present, does not evaporate or separate, then access strip member 126 can be positioned and secured in access opening 128 with holding means 142, such as a release tape, to prevent it from falling out of access opening 128. Access opening 128 will then be sealed by the fit or engagement of tapering sides 134, 136 and the sealing provided by holding means 142. Furthermore, additional sealing is provided about tub opening 164 by sealing means 166 as earlier described.

In order to remove a single mitt wipe 106, the user can insert his or her finger between outer finger latch 176 (FIG. 13A) and front wall 154, thereby levering or separating wedge-like tip 178 from wedge-like extension 182. Once locking surfaces 180, 184 are separated, outer finger latch 176 can be moved upwardly, as viewed in FIG. 13, to open lid member 108. Once open, the user can remove as many mitt wipes 106 as desired, and then close lid member 108 to seal mitt wipes 106 within tub body 124.

Dispenser 104 can be made of any suitable material or materials, and can be manufactured in any suitable manner. For example, dispenser 104 can be made of polystyrene, polypropylene, polyethylene, polyester, or the like, and can be manufactured by, for example, a vacuum molding process or an injection molding process. The structural elements of dispenser 104, for example, top wall 110, continuous side member 112, continuous side wall 150, and bottom wall 158, can have any desired thickness. A suitable range of thickness for a dispenser 104 is between about 0.25 mils to about 0.42 mils.

While this invention has been described as having a preferred embodiment, it will be understood that it is capable of further modifications. This is therefore intended to cover any variations, uses, equivalents, or adaptations of the invention following the general principles of, and including such departures from the present disclosure as come or may come within known or customary practice in the art to which this invention pertains and fall within the limits of the appended claims.

What is claimed is:

1. A dispenser and a plurality of mitt wipes contained in said dispenser, comprising:

a tub body comprising a continuous side wall and a bottom wall forming a tub interior and a tub opening, said continuous side wall including a peripheral rim portion, a plurality of mitt wipes contained in said tub interior, each said mitt wipe comprising a mitt body including an interior space and a mitt opening adapted for inserting a hand therethrough and into said interior space, an access flap member at said mitt opening and extending outwardly beyond said mitt opening, a reinforcing cuff member at said mitt opening and being bonded to said mitt body, a lid member hingedly joined to said tub body, said lid member being movable between a closed position wherein said tub opening is closed and an open position wherein said tub opening is open for the dispensing of said mitt wipes, said lid member including a peripheral edge portion, a sealing means between said peripheral rim portion and said peripheral edge portion for sealing said lid member against said continuous side wall in said closed position, and a positive latching means for latching said lid member to said tub body in said closed position.

2. The dispenser and mitt wipes of claim 1 wherein said lid member further includes an access strip member, said access strip member being removable from said lid member to define an access opening through which said mitt wipes can be dispensed.

3. The dispenser and mitt wipes of claim 2 wherein said access strip member is replaceable in said access opening to seal said access opening.

4. The dispenser and mitt wipes of claim 3 wherein said mitt wipes are interfolded in said tub body for individually dispensing said mitt wipes through said access opening.

5. The dispenser and mitt wipes of claim 4 wherein said tub body has a dimension equal to or less than about 10 centimeters.

6. The dispenser and mitt wipes of claim 1 wherein each said mitt wipe includes a solution.

7. The dispenser and mitt wipes of claim 1 wherein said sealing means includes a downwardly extending flange and an upwardly extending flange, said flanges providing complementary sealing edges at said tub opening when said lid member is in a closed position.

8. The dispenser and mitt wipes of claim 7 wherein said flanges are in mutual contact when said lid member is in said closed position.

9. The dispenser and mitt wipes of claim 8 wherein said downwardly extending flange is totally peripherally arranged around said lid member, and said upwardly extending flange is totally peripherally arranged around said tub opening.

10. The dispenser and mitt wipes of claim 9 wherein said peripheral rim portion includes a support surface, and said downwardly extending flange rests on said support surface when said lid member is in said closed position.

11. The dispenser and mitt wipes of claim 1 wherein said positive latching means comprises an outer finger latch extending downwardly from said peripheral edge portion of said lid member, and wherein a wedge-like extension is on said peripheral rim portion of said tub body, and said wedge-like extension engages said outer finger latch when said lid member is in said closed position.

12. The dispenser and mitt wipes of claim 11 wherein said positive latching means further comprises at least one guide pin extending downwardly from said lid member and being spaced inwardly of said outer finger latch, and wherein said continuous side wall of said tub body has an end portion positioned between said outer finger latch and said at least one guide pin when said lid member is in said closed position.

13. The dispenser and mitt wipes of claim 12 wherein said outer finger latch includes a wedge-like tip having a locking surface thereon, said wedge-like extension includes a locking surface thereon, and said locking surfaces engage one another when said lid member is in said closed position.

14. A dispenser and a plurality of mitt wipes contained therein, comprising:

a tub body comprising a continuous side wall, and a bottom wall, a top wall forming with said tub body a tub interior, a plurality of mitt wipes contained in said tub interior, each said mitt wipe comprising a mitt body including an interior space and a mitt opening adapted for inserting a hand therethrough and into said interior space, an access flap member at said mitt opening and extending outwardly beyond said mitt opening, a reinforcing cuff member at said mitt opening and being bonded to said mitt body, an access strip member in said top wall, said access strip member being removable to define an access opening in said top wall through which said mitt wipes are dispensed and being replaceable to close said access opening, and a holding means for retaining said access strip member in said access opening.

15. The dispenser and mitt wipes of claim 14 wherein said top wall includes a lid member hingedly joined to said tub body, said lid member being movable between a closed position and an open position wherein said mitt wipes can be dispensed from said tub interior.

16. The dispenser and mitt wipes of claim 15 wherein said lid member forms a tub opening when in said open position.

17. The dispenser and mitt wipes of claims 16 wherein said lid member further comprises a peripheral edge portion, and wherein said tub body comprises a peripheral rim portion, said peripheral edge portion and said peripheral rim portion having complementary sealing edges for sealing said tub opening when said lid member is in said closed position.

18. The dispenser and mitt wipe of claim 17 wherein each said mitt wipe includes a solution.

19. The dispenser and mitt wipes of claim 18 wherein said mitt wipes are interfolded together in said tub interior and are individually dispensable through said access opening in said top wall.

20. The dispenser and mitt wipes of claim 14 wherein said tub body has a dimension equal to or less than about 10 centimeters.

21. A dispenser and a plurality of mitt wipes contained therein, comprising:

a tub body comprising a continuous side wall and a bottom wall forming a tub interior and a tub opening, said continuous side wall including a peripheral rim portion, a plurality of mitt wipes contained in said tub interior, and a lid member hingedly joined to said tub body, said lid member being movable between a closed position wherein said tub opening is closed and an open position wherein said tub opening is open for the dispensing of said mitt wipes, said lid member including a peripheral edge portion, each said mitt wipe comprising a mitt body including an interior space and a mitt opening adapted for inserting a hand therethrough and into said interior space, an access flap member at said mitt opening and extending outwardly beyond said mitt opening, and a reinforcing cuff member at said mitt opening and being bonded to said mitt body.

22. The dispenser and mitt wipes of claims 21 wherein each said mitt body comprises an entangled mixture of natural fibers and synthetic fibers.

23. The dispenser and mitt wipes of claim 22 wherein said natural fibers are present in an amount between about 55 percent to about 80 percent of the total weight of said fibers, and said synthetic fibers are present in an amount of between about 45 percent to about 20 percent of the total weight of said fibers.

24. The dispenser and mitt wipes of claim 23 wherein said entangled mixture of said natural fibers and said synthetic fibers has a basis weight between about 50 grams per square meter to about 100 grams per square meter.

25. The dispenser and mitt wipes of claim 24 wherein said interior space of each said mitt body has a minimum width dimension of at least about 10 centimeters.

26. The dispenser and mitt wipes of claim 25 wherein each said mitt body further includes a solution.

27. The dispenser and mitt wipes of claim 21 wherein each said mitt body comprises natural fibers that are mechanically bondable.

28. The dispenser and mitt wipes of claim 21 wherein each said mitt body comprises synthetic fibers that are fusion bondable.

* * * * *